Patented Nov. 25, 1952

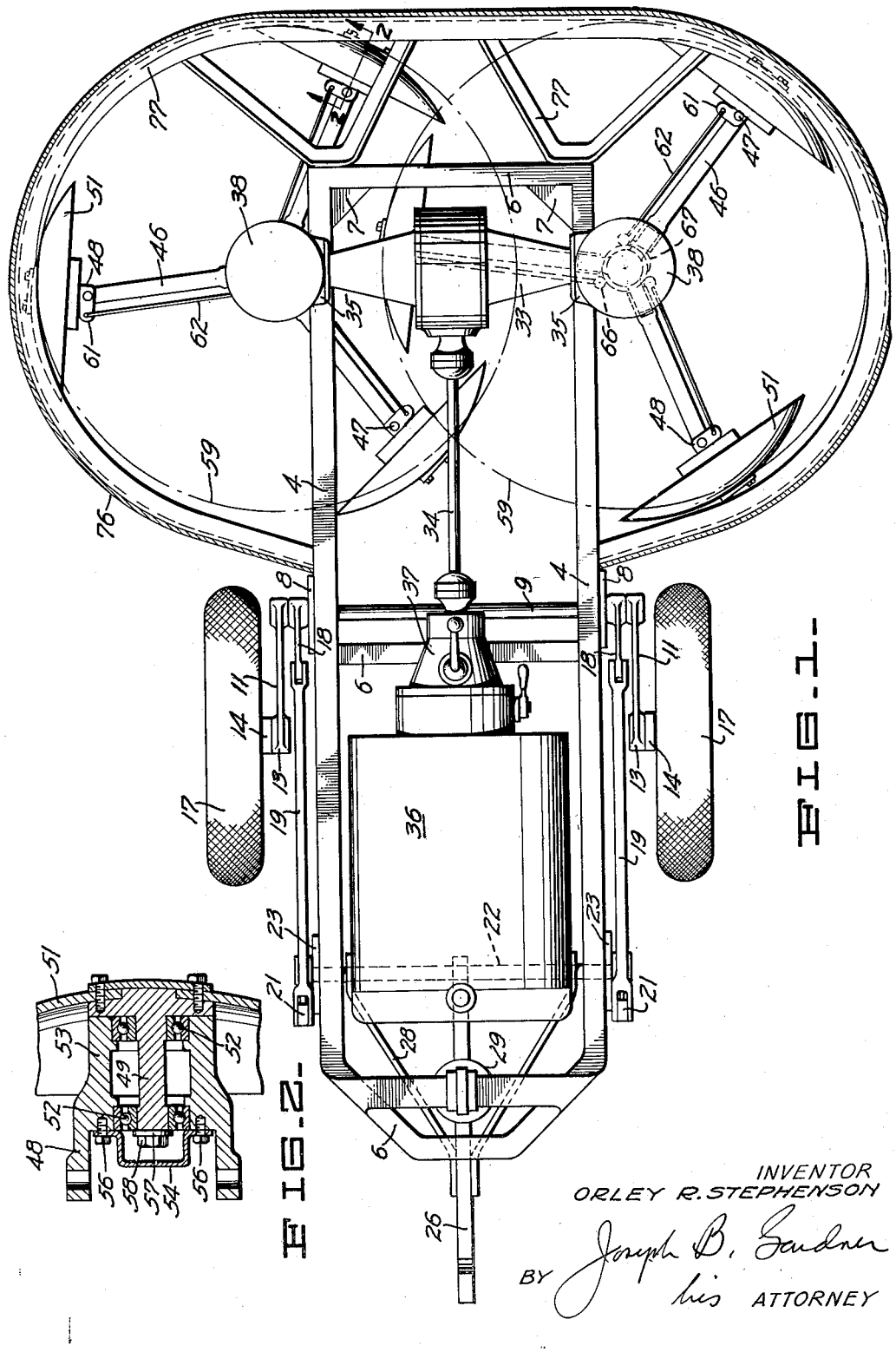

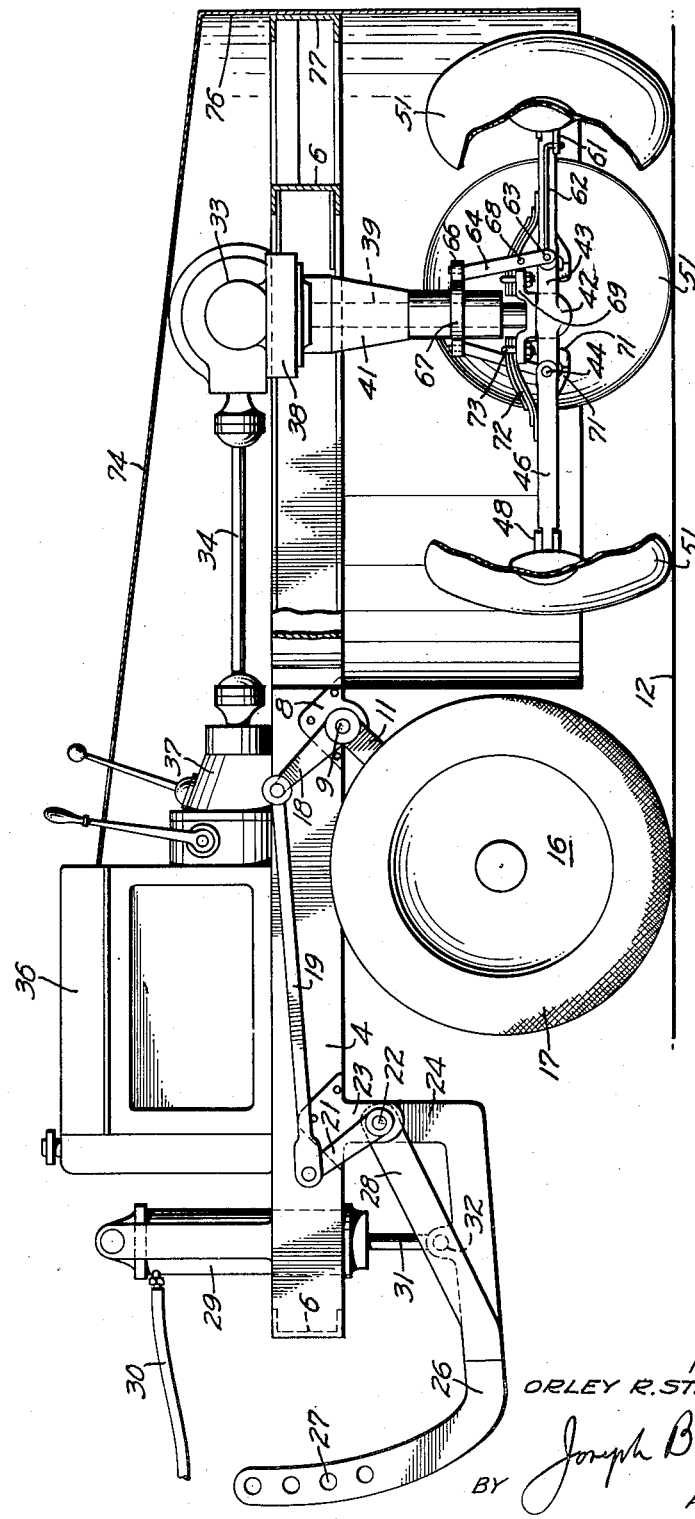

2,619,017

UNITED STATES PATENT OFFICE 2,619,017

ROTARY DISK PLOW

Orley R. Stephenson, Oakland, Calif.

Application January 20, 1947, Serial No. 722,980

5 Claims. (Cl. 97—43)

This invention relates to powered machines for tilling the soil.

An object of the invention is to provide a disk plow designed to combine the actions of a plow, harrow and cultivator so that the soil, after one pass of the apparatus, is in such a finely divided state that planting may be immediately undertaken.

Another object of the invention is to provide a rotary disk plow mechanism in which are provided means for regulating the degree of fineness to which the soil is reduced and also the depth from the surface that the soil is broken up, both of these means being readily controllable by and at the option of the operator.

A further object of the invention is to provide apparatus of the character described in which the soil cutting elements are substantially completely enclosed within a housing which not only reduces to a minimum the large amounts of airborne dust which are usually stirred up by ground breaking tools, but also serves as an effective shield for preventing the cutting elements from striking and seriously injuring workers or other persons who might come in dangerously close proximity to the cutting elements.

Still another object of the invention is to provide, in apparatus of the class referred to, one or more rotors each comprising one or more cutter disks arranged for movement in substantial planar tangency around and with a circular orbit centered on a linear path along which the rotor may advance over the ground to be tilled, the disks being progressively movable between said positions of tangency and angular positions with respect to the orbit so that, in a predetermined extent of the latter, the disks will be made to slice into the soil while in other portions of the orbit the disks will progress without any slicing action.

Yet another object of the invention is to provide in a plow of the class described, ground cutting rotors arranged for movement about axes substantially normal to the surface of the ground and movable bodily in a radial direction so as to cut into the packed soil and to subsequently repeatedly traverse the cuttings so as to finely fragment the latter.

A still further object of the invention is to provide, in apparatus of the class described, ground cutting and fragmenting mechanism in which the cutting elements after being set to penetrate the soil to a predetermined depth will yield to vertically rise in passing over rocks or other sizeable buried obstructions which may be encountered.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 1 is a top plan view of the plow of my invention.

Figure 2 is a portional vertical sectional view, to an enlarged scale, of the cutter disk hub structure. The plane in which the view is taken is indicated by the line 2—2 of Figure 1.

Figure 3 is a side elevational view of the structure shown in Figure 1, portions of the view being broken away so as to more clearly disclose the internal construction.

In the form in which I have chosen to illustrate my invention, I provide a frame comprising parallel side rails 4 joined together at their ends, and at one or more intermediate points, by crossmembers 6, the junction being effected by welding, by riveted gusset plates 7 or in any other suitable manner. Journaled in bearing brackets 8 suitably attached to the side rails 4 is a shaft 9 extending transversely of the frame and having arms 11 secured to its opposite ends inclined angularly downwardly toward the ground 12. The lower end of each arm 11 is fitted with a hub 13 from which extends, outwardly of the frame, an axially horizontal axle 14 on which is journaled a wheel 16 provided with a tire or similar tread element 17 engaging the surface of the ground 12. Also attached to and extending upwardly from opposite ends of the shaft 9 are levers 18 pivotally engaged at their distal ends to the rearward ends of links 19, the opposite or forward ends of the links being similarly pivotally connected to the distal ends of levers 21 secured to and rising from the opposite ends of a rocker shaft 22 journaled in bearing brackets 23 suitably secured to the forward portions of the side rails 4. Also secured to the rocker shaft 22, at a point substantially midway between the ends thereof, is a lever 24 extending downwardly and forwardly to project beyond the forward end of the frame and provided with an integral upwardly extending tongue 26 having therein a series of spaced apertures 27 for receiving the pin or bolt of a tractor hitch or drawbar by means of which the plow may be moved along the ground 12. The plurality of apertures 27 and the vertical spacing thereof are for the purpose of accommodating the plow mechanism to the hitches or drawbars whose location above the ground differs widely in various makes of tractors or other vehicles which may be employed to provide transport power for the plow. An A-frame 28 or equivalent structure extending transversely across and above the forward end of the frame carries a pivotally pendant cylinder 29 from the bottom of which extends an axially reciprocable piston rod 31 pivotally connected by means of a pin 32 to the lever 24 at a point just forward of the rocker shaft 22. A piston, not shown, within the cylinder 29 is connected with and forms an integral part of the piston rod structure and is responsive to pressure changes in the cylinder to cause downward or upward movement of the rod as the case may be. Fluid under pressure may be admitted to the upper portion of the cylinder through a flexible conduit 30 which may be connected to a source of such fluid, such as the lubricating oil system of the engine of the towing vehicle, through a suitable control valve, not shown, but as is familiar to those skilled in the mechanical arts, is for the purpose of selectively admitting fluid to the cylinder or returning the fluid from the cylinder to the source. It will be seen that, upon the introduction of pressure into the cylinder, the piston rod 31 will be moved downwardly thus causing the lever 24 to swing downwardly correspondingly about its pivot, which is the rocker shaft axis. Due to the fact that levers 21 are securely fixed to the rocker shaft they will, in this case, swing forwardly and through the link 19 will cause a corresponding movement of the levers 18. This will, of course, cause rotational movement of the shaft 6 to swing the arms 11 downwardly and similarly move the wheels 16. The result of these movements is that the frame will be elevated above the surface of the ground in proportion to the degree of extension of the piston rod. Conversely, when fluid in the cylinder is allowed to exhaust therefrom the frame, by a reversal of the actions above described, the implement will be lowered to approach the surface of the ground.

Mounted in brackets 32, secured to the side rails 4 adjacent the rearward end thereof, is a housing 33 enclosing a jackshaft connected through suitable bevel gearing to be driven by a propeller shaft 34 which derives its rotative force from an internal combustion engine contained within the hood structure 36. A suitable clutch and selective gear transmission 37 is provided by means of which the rotational speed of the propeller shaft 34 relative to that of the engine may be selectively varied. The opposite outer ends of the housing 33 are provided with gear boxes 38 containing suitable bevel gearing connected respectively with the jackshaft and with axially vertical rotor shafts 39 extending downwardly from the gear boxes through projected tubular stem portions 41 thereof. The lower end of each rotor shaft 39 is provided with a head member 42, suitably secured thereto and rotatable therewith, from which projects a plurality, preferably three, of radially extending lugs 43 each of which, at its distal end, is provided with an axially horizontal pivot pin 44 to which is pivotally attached the inner clevised end of a normally horizontal cutter arm 46, the outer end of each arm being provided with an axially vertical pivot pin 47 to which is pivotally connected the clevised end portion 48 of a stub shaft 49 serving as the rotational support for a dish-shaped cutter disk 51 having a sharpened peripheral edge. As shown in Figure 2, the shaft 49 is fitted with bearings 52 retained within a tubular hub 53 provided with a flange 54 to which the cutter disk 51 is removably secured by suitable screws or bolts 56. A washer 57 and a nut 58 serve to retain the bearings 52 on the shaft 49. It will be seen that when the engine is running, the propeller shaft 34 will be rotated thus imparting, through the medium of the jackshaft and its associated bevel gearing, a corresponding rotation to each of the vertical rotor shafts 39 so that the latter revolve in opposite directions. This will cause the cutter disks 51 to move in orbital paths, indicated by the numeral 59 around the axes of their associated shafts. The arrangement of the parts and the relative spacing between the axes of the shafts 39 are such that the cutter paths 59 will overlap radially so as to cause the cutter disks to traverse completely the entire transverse width of the swath cut in the ground by the plow. When the plow is stationary relative to the ground, the cutter disks will describe the aforesaid circular orbital paths. However, when the plow is moved over the ground by the towing vehicle, the orbitally moving cutter disks will describe continuous helical paths, the spacing between convolutions of which is a direct function of the speed of rotation of the shafts 39 and the rate of linear advancement of the plow along the ground. Since either or both of these speeds may be varied at will, it is possible to produce a wide range of coarse or fine plowing cuts to which the ground may be subjected.

Means are provided for feathering the cutter disks so as to cause them, during a portion of their orbital movement, to move in tangential registry with and along the orbital paths 59, and for moving the disks so as to cause them, in other portions of their orbital movement, to assume angular positions relative to the orbital path and thereby bite or slice into the ground as the plow advances along the ground. This action is effected by providing each of the clevised end portions 48 of the cutter disk shafts with an integral radially extending lever 61 apertured adjacent its distal end to receive a pivot stud carried by one end of a push rod 62 extending parallel with the adjacent cutter arm 46 and provided at its other end with an axially horizontal pivot stud 63 engaged in the apertured lower end of a rocking lever 64. The rocking lever carries, at its upper end, an axially vertical roller 66, bearing against the periphery of a substantially eccentric cam 67 fixed to the stem portion 41 of the gear boxes 38, and a pivot pin 68, carried by a lug extension 69 of the head member 42, engages a suitable aperture provided intermediate the ends of the lever so as to pivotally mount the latter. The arrangement of the cam 67 and its cooperative mechanism is such that, while the roller 66 is riding along the radially protruded portion of the cam, the associated cutter disks will be held in tangential or feathered relationship with the orbital path 59. However, as shown in Figure 1, the cutter disks, when moving through the forward portion of the orbital path, that is, the substantially 180 degrees of arc between the vertical planes of the shafts 39 and the rotational axis of the wheels 16, are freed of the restraining force by reason of the rollers passing onto the receded cam surface thereby allowing the cutter disks to swing angularly outwardly so as to cause a rolling slicing movement of the disks into the packed soil just ahead of the plow rotors. The degree of bite of the disks into the soil is of course defined by the amount of rise and fall in the cam 67. As successive bites are taken from the packed soil by the advancing cutter disks the more or less lumpy cuttings remain in situ until they are reached by the feathered disks traversing the rearward portion of the path 59 whereupon they are subjected to repeated rolling and cutting actions by the disks and reduced to finely divided form. It will of course be understood that the more rapidly the cutter rotors are revolved, in proportion to the rate of forward movement of the plow, the greater will be the frequency with which the cutter disks traverse a given area of the plow wake and the finer the trailings will be cut.

As was explained previously, the operation of the cylinder 29 will effect a raising or lowering of the plow frame relative to the wheels 16 and consequently the ground 12. It follows therefore that since the plow rotor structures are rigidly secured to the frame, the former will also rise and fall in response to operations of the cylinder 29. It is thus possible for the operator, at any time, to regulate the depth that the cutter disks 51 may vertically enter the soil. In order to prevent descension of the cutter disks beyond a certain limit wherein the arms 46 are substantially parallel with the surface of the ground, I provide stops comprising integral lugs 71, carried by the arms 46 and lugs 43 of the head member, which are adapted to mutually abut so as to prevent movement of the arms downwardly beyond their normally horizontal positions. The arms 46, of course, are free to swing upwardly about the centers of the pivot pins 44. Provision is thus made for the cutter disks 51 to rise vertically and ride over rocks or other sizeable sub-surface obstructions such as roots which may be encountered. To resiliently resist such upward swinging of the cutter disks, I provide leaf springs 72 secured by U-bolts 73, or otherwise, to the lugs 69 and having their free ends bearing on top of the arms 46 at points spaced radially outwardly from the pivot pins 44.

It will be noted that the centers of the pivot pins 44 and the studs 63 are made to substantially coincide in the normal cutting positions of the disks so that in the event an obstruction is encountered and one or more of the cutter disks are forced to rise vertically, very little change in the angular setting of the disks tangentially of the orbital path 69 will occur.

When a plow of the nature described is in operation, the rapidly revolving rotors not only constitute an extreme hazard liable to cause severe bodily injury to persons who may accidently come in contact with them, but they also cause the ascension of dense clouds of dust which render visibility difficult and produce respiratory discomfort to the operator. I have succeeded in both guarding the rotors against striking persons or objects who or which may apporach dangerously close thereto, and reducing to an unobjectionable minimum the dust which may ascend into the air around the plow. This I accomplish by providing a sheet metal hood comprising a top plate 74, completely overlying and extending beyond the circular areas of operation of the rotors, having a marginal, downwardly extending skirt 76 which terminates above the ground 12 a distance substantially equal to the depth to which the cutter disks may enter the soil. A suitable frame 77 secured to and extending from the plow frame is connected with and supports the top plate 74 and the skirt 76 of the hood. The larger portion of the dust which would be otherwise flung into the air above the rotors is trapped by the hood and will settle back upon the ground. Some dust of course will escape through the gap between the ground surface and the lower edge of the skirt 76, which skirt also enables the plow of my invention to be used with marked success in the cultivation of orchards since the rotors will be prevented from approaching sufficiently close to the tree trunks as to damage them.

I claim:

1. A rotary plow comprising a mobile carriage, a rotor shaft supported by said carriage in substantially axially normal relationship with the surface of the ground, said rotor shaft having a radially extending arm thereon, a cutter of circular form pivotally carried by said arm and movable in engagement with the ground in an orbital path around the axis of said rotor, means interposed between said rotor and said cutter for varying the position of said cutter relative to said arm and to said orbital path, said means including a cam and a cam follower associated with said cutter independent of said arm, and means for selectively varying the position of said carriage and said cutter in a substantially vertical direction relative to said surface of the ground.

2. A rotary plow comprising a mobile carriage, a rotor including an axially vertical shaft journaled on said carriage, power means on said carriage connected with and to drive said shaft, a radially extending arm carried by said shaft and mounted on and for pivotal movement in a plane substantially parallel to the axis thereof, a diametrically vertical cutter disk journaled on said arm and engageable with the ground, said cutter disk, when the shaft is rotated, being movable by said arm in a circular orbital path about the axis of the shaft, means interposed between said disk and shaft operative during movement of the disk along said orbital path for varying the angular position of the disk relative to the path, said means including an eccentric cam and a cam follower associated with said cutter independent of said arm, and fluid-powered means carried by said carriage for raising and lowering said carriage and its connected rotor and cutter disk relative to the surface of the ground.

3. A rotary plow comprising a mobile carriage, a rotor including an axially vertical shaft journaled on said carriage, power means on said carriage connected with and to drive said shaft, a radially extending arm carried by said shaft and mounted on and for pivotal movement on a plane substantially parallel to the axis thereof, a diametrically vertical cutter disk journaled on said arm and engageable with the ground, said cutter disk, when the shaft is rotated, being movable by said arm in tangential relation to a circular orbital path about the axis of the shaft, said cutter disk being movable between diametrically angular positions relative to said arm, a fixed cam of substantially eccentric form positioned adjacent the junction of said shaft and arm, and a push rod connected with said cutter disk and operatively engaged with said cam for moving the cutter disk between said angular positions during movement of the disk along said orbital path.

4. A rotary plow comprising a mobile carriage, a rotor including an axially vertical shaft journaled on said carriage, power means on said carriage connected with and to drive said shaft, a radially extending arm carried by said shaft and mounted on and for pivotal movement in a plane substantially parallel to the axis thereof, means associated with said arm for yieldably resisting upward movement thereof, stop means on said arm for limiting downward movement thereof to maintain the arm in substantial parallelism with the ground, a diametrically vertical cutter disk journaled on said arm and engageable with the ground, said cutter disk, when the shaft is rotated, being movable by said arm in a circular orbital path about the axis of the shaft, means interposed between said disk and shaft operative during movement of the disk along said orbital path for varying the angular position of the disk relative to the path, said means including a cam and a cam follower associated with said cutter independent of said arm, and fluid-powered means carried by said carriage for raising and lowering said carriage and its connected rotor and cutter disk relative to the surface of the ground.

5. A rotary plow comprising a mobile carriage, a rotor including an axially vertical shaft journaled on said carriage, power means on said carriage connected with and to drive said shaft, a head member rotatable with said shaft and secured to the lower end thereof, an arm pivotally connected with said head member and extending radially of said shaft, said arm being free to swing from a normal position in an upward direction and being restrained from movement downwardly from said normal position, an axially vertical pivot joint at the distal end of said arm, a spindle shaft connected with said pivot joint and adapted to move in a horizontal direction around the axis thereof, a diametrically vertical cutter disk journaled on said spindle shaft and positioned in peripheral engagement with the ground, said cutter disk upon rotation of said shaft being movable in substantial tangency with and along a circular orbit about the axis of the shaft, a fixed substantially elliptical cam, a follower carried by said head member and movable along the periphery of the cam, and a control member connecting said follower and a portion of the spindle shaft for moving the cutter disk into a position angularly related to said orbital path during a portion of the movement of the cutter disk therealong.

ORLEY R. STEPHENSON.

REFERENCES CITED

The following references are of record in the file of this patent:

UNITED STATES PATENTS

| Number | Name | Date |
|---|---|---|
| 2,027,910 | Herring | Jan. 14, 1936 |
| 2,110,790 | Daugherty et al. | Mar. 8, 1938 |
| 2,410,918 | Acton | Nov. 12, 1946 |
| 2,419,308 | Austin | Apr. 22, 1947 |
| 2,429,298 | Savage | Oct. 21, 1947 |
| 2,430,696 | Acton | Nov. 11, 1947 |

FOREIGN PATENTS

| Number | Country | Date |
|---|---|---|
| 41,497 | Sweden | Nov. 23, 1912 |